United States Patent
Yalagandula et al.

(10) Patent No.: US 8,228,794 B2
(45) Date of Patent: Jul. 24, 2012

(54) MINIMIZING PATHOLOGICAL FLOODING OF A NETWORK

(75) Inventors: Praveen Yalagandula, Redwood City, CA (US); Jayaram Mudigonda, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 12/699,616

(22) Filed: Feb. 3, 2010

(65) Prior Publication Data

US 2011/0188372 A1    Aug. 4, 2011

(51) Int. Cl.
*H04L 12/56* (2006.01)
(52) U.S. Cl. ........................................ 370/230; 370/400
(58) Field of Classification Search .................. None
See application file for complete search history.

(56) References Cited

U.S. PATENT DOCUMENTS

| | | | |
|---|---|---|---|
| 6,999,418 B2* | 2/2006 | Sharma et al. | 370/230 |
| 7,787,450 B1* | 8/2010 | Chan et al. | 370/389 |
| 8,116,310 B2* | 2/2012 | Boers et al. | 370/389 |
| 2006/0023724 A1* | 2/2006 | Na et al. | 370/395.53 |
| 2010/0146093 A1* | 6/2010 | Kuik | 709/223 |

* cited by examiner

*Primary Examiner* — Min Jung (57) ABSTRACT

In a method for minimizing pathological flooding of a network using a destination node, a packet is received from a source node at the destination node. The packet is transmitted from the source node to the destination node along a path. A determination is made by a node whether the packet indicates a possibility of pathological flooding. In response to a determination that the packet indicates a possibility of pathological flooding, a dummy packet is forwarded along the path to the source node.

20 Claims, 9 Drawing Sheets

DESTINATION
END HOST TABLE
300

TIME LAST RECEIVED FROM SOURCE END HOST

TIME LAST SENT TO SOURCE END HOST

| SOURCE END HOST MAC ADDRESS 301 | TIME ti 302 | TIME tj 303 |
|---|---|---|
| SOURCE END HOST MAC ADDRESS 301A | ti 302A | tj 303A |
| SOURCE END HOST MAC ADDRESS 301B | ti 302B | tj 303B |
| SOURCE END HOST MAC ADDRESS 301C | ti 302C | tj 303C |
| ⋮ | ⋮ | ⋮ |

*FIG. 3A*

EDGE SWITCH
END HOST MAPPING TABLE
350

| EDGE SWITCH SOURCE NODE MAC ADDRESS 351 | SOURCE END HOST MAC ADDRESS 352 |
|---|---|
| EDGE SWITCH SOURCE NODE MAC ADDRESS 351A | SOURCE END HOST MAC ADDRESS 352A |
| EDGE SWITCH SOURCE NODE MAC ADDRESS 351A | SOURCE END HOST MAC ADDRESS 352B |
| EDGE SWITCH SOURCE NODE MAC ADDRESS 351B | SOURCE END HOST MAC ADDRESS 352C |
| EDGE SWITCH SOURCE NODE MAC ADDRESS 351B | SOURCE END HOST MAC ADDRESS 352D |
| ⋮ | ⋮ |

*FIG. 3B*

EDGE SWITCH
DESTINATION NODE TABLE
360

| EDGE SWITCH SOURCE NODE MAC ADDRESS 351 | TIME ti 353 (TIME LAST RECEIVED FROM EDGE SWITCH SOURCE NODE) | TIME tj 354 (TIME LAST SENT TO EDGE SWITCH SOURCE NODE) |
|---|---|---|
| EDGE SWITCH SOURCE NODE MAC ADDRESS 351A | ti 353A | tj 354A |
| EDGE SWITCH SOURCE NODE MAC ADDRESS 351B | ti 353B | tj 354B |
| EDGE SWITCH SOURCE NODE MAC ADDRESS 351C | ti 353C | tj 354C |
| ⋮ | ⋮ | ⋮ |

MINIMIZING PATHOLOGICAL FLOODING OF A NETWORK

BACKGROUND

Switches in a network learn forwarding information and fill forwarding tables for packets based on source addresses in packets that the switches receive on their interfaces (e.g., ports). For example, a switch that receives a packet with source media access control (MAC) address M1 on interface P1 makes an entry in its forwarding table: (M1, P1). The switch creates a new entry or refreshes an existing entry in the forwarding table whenever a packet from another switch is received. From then onwards, for any received packets with destination MAC address M1, the switch will forward the packets on interface P1. The entry is expired after a predetermined time, which is referred to as the forwarding entry timeout, whenever there are no packets received having a source MAC address M1 on that interface. If there is no entry in the forwarding table for a MAC address Mi, then the switch floods the network with all packets destined for that MAC address Mi.

Whenever there is communication between two hosts in only one direction, for instance a source host to a destination host, switches on a path are unable to learn the location of the destination host if the switches on the path never receive any packets originating from the destination host. This is known to happen in the case of uni-directional flows or in the case where a forward routing path and a reverse routing path are different. In such cases, all packets from the source host to the destination host will be flooded on all links, which is a pathological flooding. This wastes bandwidth, may waste power at all switches that receive the floods, and leads to congestion in the network.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

According to an embodiment, a destination node receives a packet from a source node, whereby a node is a device. The packet is transmitted from the source node to the destination node along a path in a network. A determination is made as to whether pathological flooding is operable to occur for future packets sent from the source node to the destination node. If so, the destination node thereafter sends dummy packets periodically such that switches on the path learn the path. The destination node and source node may be end hosts or edge switches. The dummy packet may be sent using a broadcast or unicast.

The embodiments may be used, for instance, in an Ethernet network. Currently, nodes in an Ethernet network may be configured to learn a path for forwarding packets through the Ethernet network with two implicit and limiting assumptions. The assumptions are that all communications are bidirectional, and traffic in both directions between a source node and a destination node take a same path. If packets are forwarded through the network in a manner where either or both assumptions are violated, then the Ethernet forwarding may result in severe flooding.

In modern data centers and enterprises, it has been increasingly common where these assumptions may become violated. For example, some emerging media streaming applications, such as Internet Protocol television (IPTV) lead to long-lived unidirectional flows. In data centers, to achieve higher bandwidth, topologies with multiple paths between hosts are being deployed. In these topologies, however the second assumption makes it difficult to exploit all paths because the load-balancing scheme is forced to take a same path for forwarding in both directions between any two hosts. Embodiments of the invention provide a low overhead mechanism to allow efficient Ethernet forwarding in circumstances where the two implicit and limiting assumptions do not hold.

Figure 1:
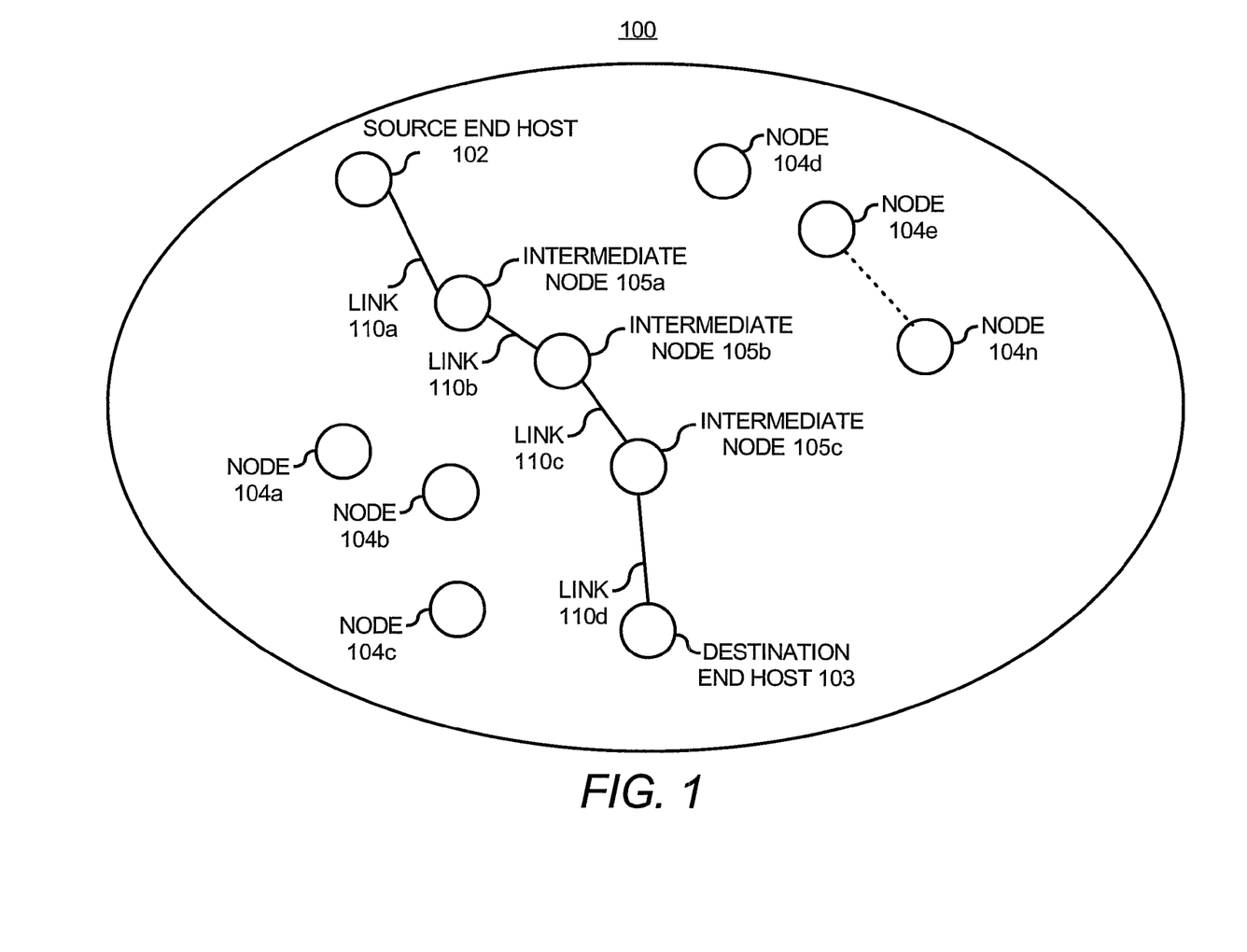
FIG. 1 shows a simplified block diagram of a network, according to an embodiment of the present invention.

FIG. 1 illustrates a simplified block diagram of a network 100, according to an embodiment. In the network 100, the method of minimizing pathological flooding of the network may be implemented at a destination node comprising an end host. It should be clearly understood that the network 100 may include additional components and that some of the components described herein may be removed and/or modified without departing from a scope of the network. As such, the network 100 may include any number of nodes, source devices, and network devices. In addition, the network 100 may be connected to an access network or any wide area network (WAN) or other network.

The network 100 includes a source end host 102, a destination end host 103, and multiple intermediate nodes 105a-105c, which are used to forward packets from the source end host 102 to the destination end host 103. The intermediate nodes 105a-c are connected by links 110a-d. The source end host 102 and the destination end host 103 may also comprise nodes in the network 100, as they may be intermediate nodes for forwarding packets to other source nodes or destination nodes in or outside of the network 100. The nodes in the network 100 may comprise switches used to forward packets or other computer devices connected to the network. The source end host 102 and the destination end host 103, also referred to as source node and destination node, may comprise computers, including servers, end user devices, etc. In addition, the network 100 includes other nodes, shown as nodes 104a-n, which may be source nodes, destination nodes and intermediate nodes in the network 100.

Figure 2:
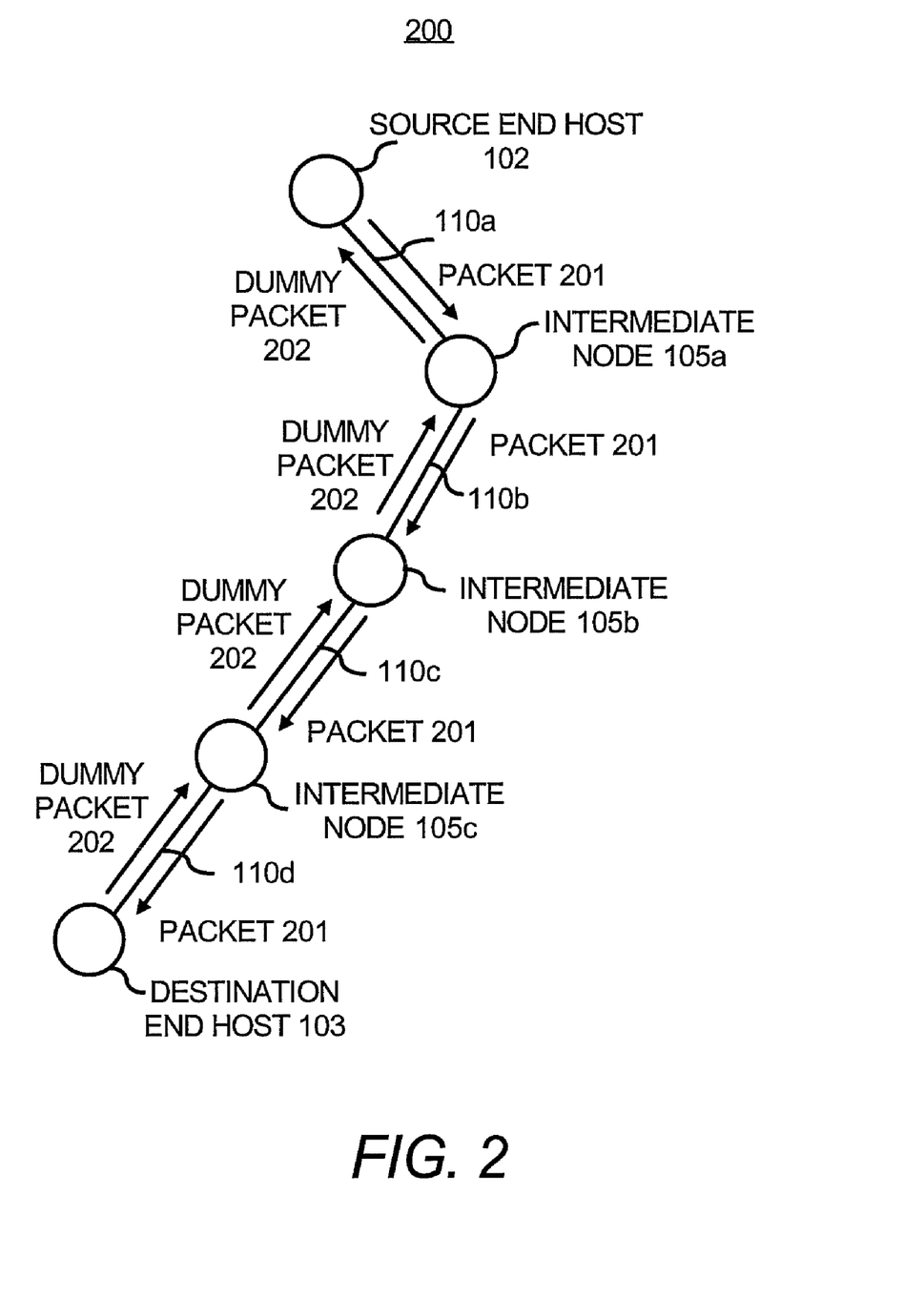
FIG. 2 shows a path from a source node to a destination node, according to an embodiment of the present invention.

As shown in FIG. 2 by way of illustration, the source end host 102 sends a packet 201 along a path to the destination end host 103 using intermediate nodes 105a-105c. The source end host 102 may receive packets from another network node or may originate packets, such as a VoIP packets, to be communicated to the destination end host 103. The source end host 102 may send the packets to the destination end host 103 using different combinations of nodes. The links 110a-110d form a path from the destination end host 103 to the source end host 102.

A node in the network determines whether pathological flooding is operable to occur. For example, the destination end host 103 determines whether pathological flooding is operable to occur for future packets sent from the source end host 102 to the destination end host 103, which is further described below. The nodes may keep track of when packets are sent and received for different sources and destinations to determine whether pathological flooding is operable to occur. Tables, such as shown in FIGS. 3A-C may be used to keep track of this information.

Figure 3A:
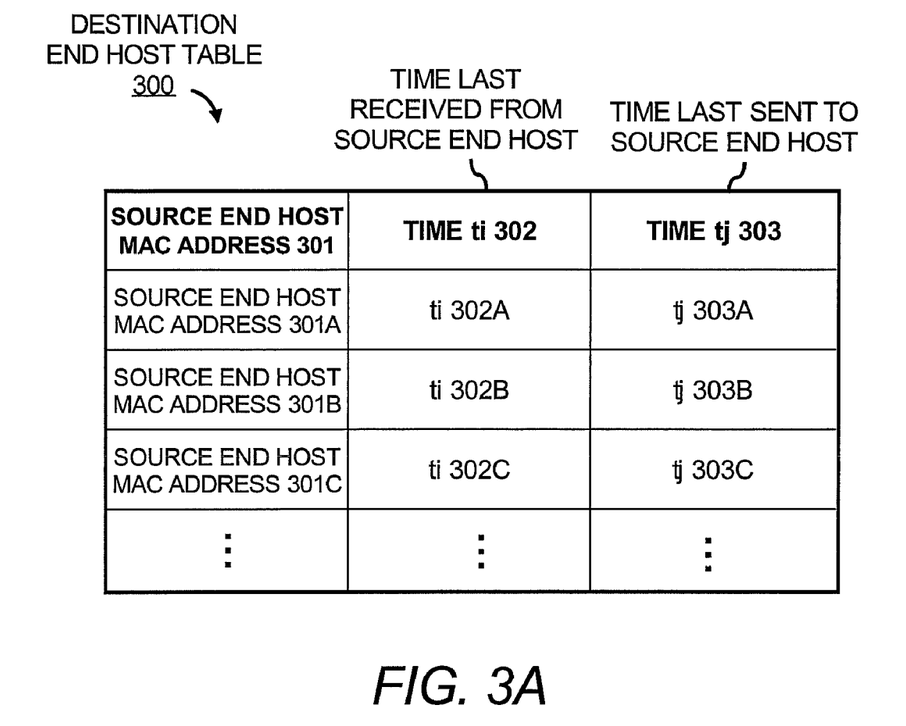
FIGS. 3A-C illustrate tables for routing, according to embodiments of the present invention.
Figure 3B:
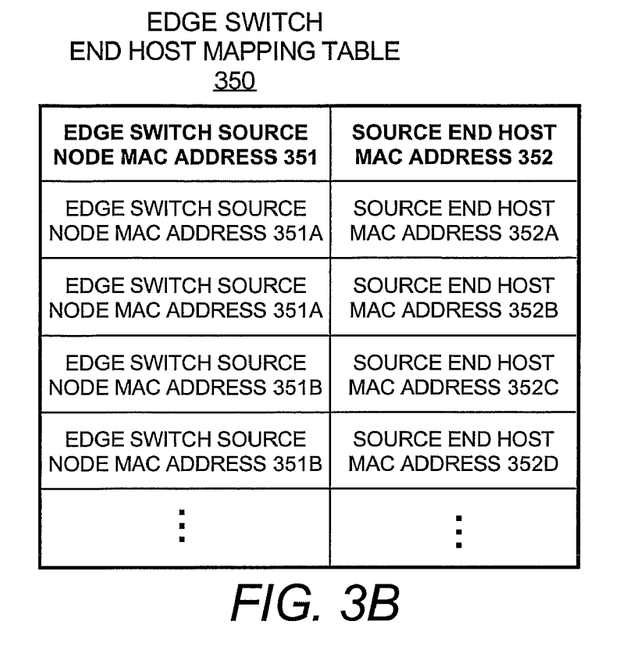
Figure 3C:
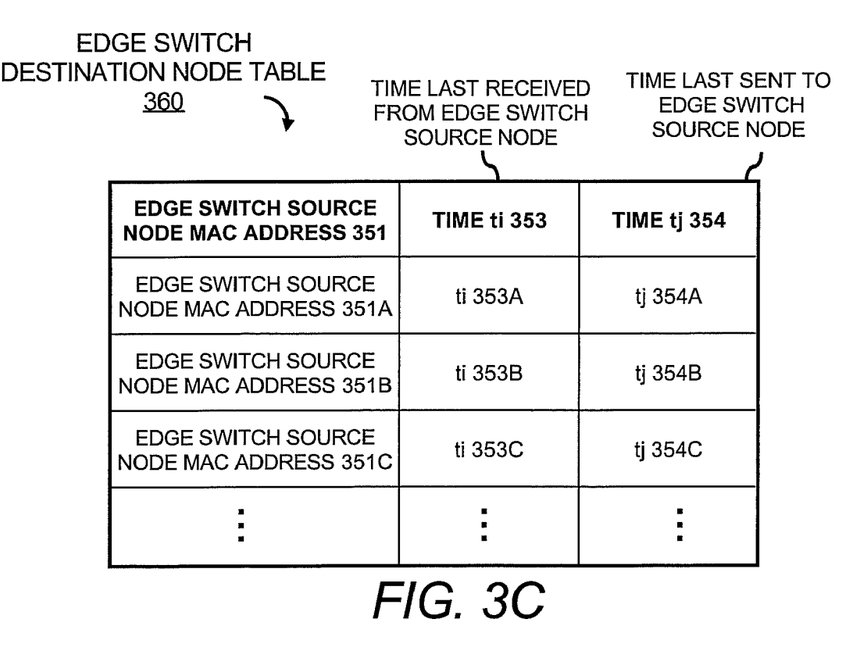

As shown in FIG. 3A, each end host, for instance the destination end host 103, maintains a table 300 for each source end host MAC address 301 from which the destination end host 103 receives packets. Although a source end host MAC address is shown, other unique IDs may be stored, such as IP addresses. Also, the source end host MAC address may also include a virtual local area network identification (VLAN id). For each source end host MAC address 301, the destination end host 103 determines ti 302, a time of receipt of a packet from the source end host MAC address 301, and tj 303, a time a packet was sent to the source end host MAC address 301. For instance, if the destination end host 103 receives a packet from the source end host 102, the destination end host 103 enters the source end host MAC address 301A in the table 300 assuming that the source end host MAC address 301A is for the source end host 102. For the entry for the source end host MAC address 301A, the time ti 302A is also stored, which is the time the destination end host 103 receives the packet from the source end host 102. For the entry for the source end host MAC address 301A, the time tj 303A is also stored, which is the time a packet was last sent from the destination end host 103 to the source end host 102.

If ti−tj is greater than a threshold T, then a dummy packet is sent. For example, if ti 302A−tj 303A>T, then the destination end host 103 sends out a dummy packet 202 as shown in FIG. 2, which may be a zero payload packet, and sets tj 303A to a current time, which is the time the dummy packet 202 is sent. The dummy packet may be sent to the source end host 102 whenever ti−tj is greater than the threshold T. tj is updated whenever a packet is sent (either dummy packet 202 or a normal packet). The normal packet may be sent as a part of regular communication from the destination end host 103 to the source end host 102. The threshold T may be a predetermined period based on forwarding entry timeout for the intermediate nodes 105a-105c. If different intermediate nodes 105a-105c have different forwarding entry timeouts, the threshold T may be less than or equal to the minimum forwarding entry timeout among the intermediate nodes 105a-105c.

The dummy packet 202, shown in FIG. 2, may be sent from the destination end host 103 to the source end host 102 periodically in order to inform the intermediate nodes 105a-105c of the path to send packets from the source end host 102 to the destination end host 103. The dummy packet 202 may contain a field in the header indicating that the dummy packet 202 is a dummy packet and may be dropped upon receipt at the source end host 102. As each node 105a-105c in the path between the source end host 102 to the destination end host 103 receives the dummy packet 202, the node creates or updates an entry for the destination to set the time tj to the time the dummy packet is sent to the source end host 102. By periodically sending the dummy packet 202, pathologically flooding by each of the intermediate nodes 105a-c may be prevented because the tables for each of the nodes may be updated to prevent flooding at those nodes. As indicated above, if ti−tj exceeds the threshold for a particular destination, it may cause the intermediate nodes to flood the network with the packet so the packet can reach its destination. However, by sending the dummy packet, the tables of the intermediate nodes are updated and may prevent flooding.

The dummy packet 202 may be sent as either a unicast message or a broadcast message. A broadcast message reaches all nodes in the network, in addition to the nodes that need to be updated for avoiding a pathological flooding. A unicast message is more efficient as it can target a path and update only a subset of nodes. Consequently, the broadcast message may require greater resources than the unicast message. However, there may not be any way to update a targeted set of nodes with unicast messages in the network 100. For instance, a path from the source end host 102 to the destination end host 103 may be physically separate from a return path from the destination end host 103 to the source end host 102. In this instance, even if the destination end host 103 sends the dummy packet 202 in a unicast message to the source end host 102, the unicast message will not reach the nodes on the path from the source end host 102 to the destination end host 103. In these instances, the destination end host 103 may send the dummy packet 202 in a broadcast message to reach all nodes in the network 100. Therefore, depending on a configuration of the network 100, the dummy packet 202 may be sent as either a unicast message or a broadcast message.

Figure 4:
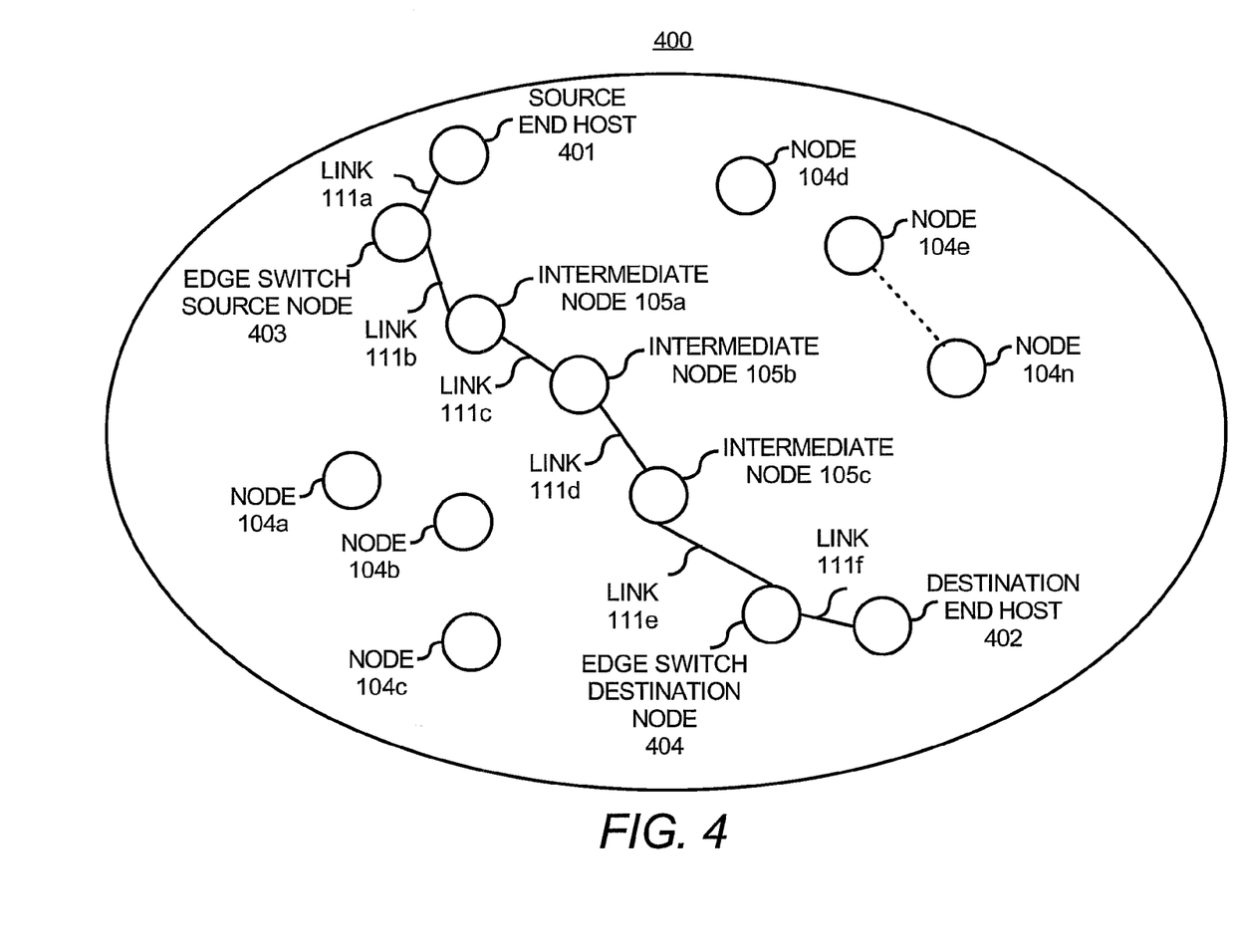
FIG. 4 shows a simplified block diagram of a network, according to an embodiment of the present invention.

FIG. 4 illustrates a simplified block diagram of a network 400, according to an embodiment. The network 400 is an alternate embodiment of the network 100 in which the method of minimizing pathological flooding of the network is implemented at nodes comprising edge switches rather than nodes comprising end hosts. An edge switch is a switch that a device, which may be an end host, goes through to gain access to the network and nodes connected to the network. It should be clearly understood that the network 400 may include additional components and that some of the components described herein may be removed and/or modified without departing from a scope of the network. As such, the network 400 may include any number of nodes, source devices, and network devices. In addition, the network 100 may be connected to an access network or any wide area network (WAN) or other network.

The edge switch source node 403 and the edge switch destination node 404 are connected to a source end host 401 and a destination end host 402, respectively. Although not shown, multiple end hosts may be connected to each edge switch. In instances where multiple end hosts are connected to a single edge switch, MAC addresses of the multiple end hosts may be mapped to the single edge switch using an edge switch end host mapping table 350, as shown in FIG. 3B. The edge switches may communicate with each other to exchange information, such as the MAC addresses for the source end hosts connected to each edge switch. Thus, the end host mapping table 350 for each edge switch may contain the MAC addresses of the source end hosts for each edge switch in the table. For instance, the edge switch source node MAC address 351A of the edge switch source node 403 corresponds to source end host MAC address 352A. The edge switch source node MAC address 351A also corresponds to source end host MAC address 352B, which is the MAC address of a different source end host (not shown in FIGS. 4 and 5).

FIG. 3C shows a table 360 substantially similar to table 300 shown in FIG. 3A, except, the table 360 substitutes the edge switch source node MAC address 351 for the source end host MAC address 301 in the table 300. The table 360 may be referred to as a edge switch destination node table. Each edge switch in the network 100 maintains a table such as table 360, as shown in FIG. 3C, for each node that is connected to the edge switch. For instance, as described with respect to FIG. 4, when the edge switch destination node 404 receives a packet sent from the source end host 401 to the destination end host 402, at time t, the edge switch destination node 404 updates the ti for the entry S in the table 360 corresponding to the destination end host 402.

The edge switch destination node 404 uses the table 350 to determine the corresponding edge switch source node MAC address. The edge switch destination node 404 may thereafter send a dummy packet 202 to the edge switch source node 403 after a determination that pathological flooding is operable to occur for future packets sent from end hosts connected to the edge switch source node 403. If the edge switch destination node 404 determines that the dummy packet 202 needs to be sent, the edge switch destination node 404 sends the dummy packet 202 to the edge switch source node 403. The source address in the header of the dummy packet is set with the address of the destination end host 402. Note that the source address included with the dummy packet 202 is not the address of the edge switch destination node 404.

Figure 5:
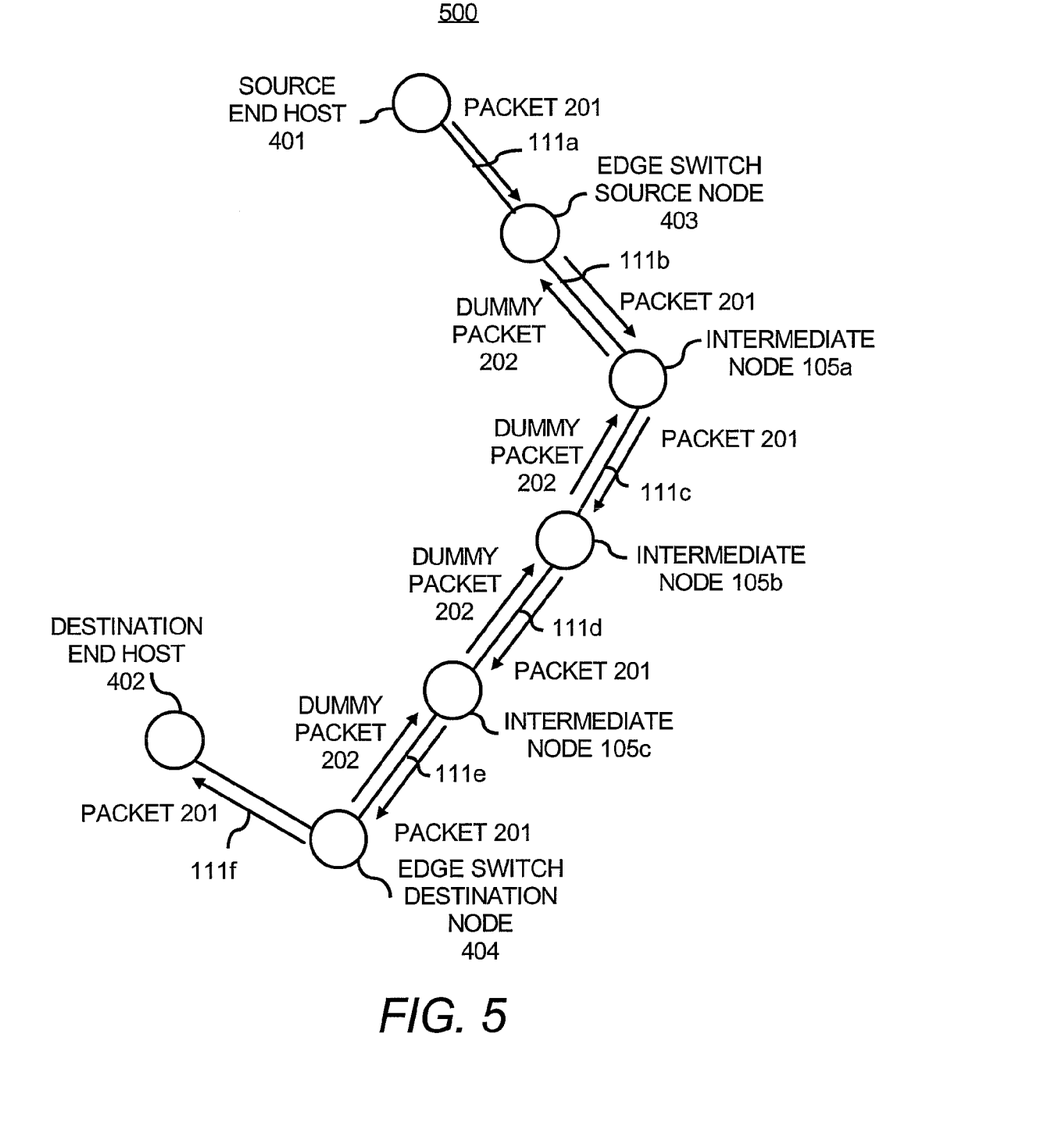
FIG. 5 shows a path from a source node to a destination node, according to an embodiment of the present invention.

For example, as shown in FIG. 5, the edge switch destination node 404 may receive a packet 201 from the source end host 401. The edge switch destination node 404 determines a destination MAC address for the destination of the packet 201, which may be a destination end host 402. The edge switch destination node 404 then determines the corresponding edge switch source node for the source end host 401, which may be an edge switch source node 403, using the table 350. Thereafter, the edge switch destination node 404 enters a time ti 353, which is a time of receipt of a packet from the edge switch source node MAC address 301 into the table 360. A single time ti 353, which is a last time the edge switch destination node 404 received a packet from any source end host connected to the edge switch source node, is therefore entered in the table 350 for multiple end host MAC addresses 352 from which the edge switch destination node 404 receives packets. The edge switch destination node 404 also stores a time tj, which is the time a packet was last sent from the edge switch destination node 404 to the edge switch source node 403 in the table 360. This may be either a dummy packet or a packet destined to any end host connected to the edge switch source node 403 and whose source address is the address of the destination end host 402.

If ti−tj is greater than a threshold T, then a dummy packet is sent. For example, if ti 353A−tj 354A>T, then the edge switch destination node 404 sends out a dummy packet 202 as shown in FIG. 5, which may be a zero payload packet, and sets tj 354A to a current time, which is the time the dummy packet 202 is sent. If different nodes have different forwarding entry timeouts, the threshold T may be less than or equal to the minimum forwarding entry timeout among the intermediate nodes 105a-105c.

The dummy packet 202, shown in FIG. 5, may be sent periodically from the edge switch destination node 404 to the edge switch source node 403. The edge switch destination node 404 thereby informs the intermediate nodes 105a-105c of the path to send packets from source end hosts connected to the edge switch source node 403 to destination end hosts connected to the edge switch destination node 404. For each connection in which a pathological flooding is operable to occur for future packets, the edge switch destination nodes, on behalf of the destination end hosts, sends out the dummy packets to corresponding source end hosts for each of the destination end hosts. Paths may be maintained for multiple end hosts connected to each edge switch. The same or different paths may be maintained for each destination end host/ source end host pair. One advantage of the edge switch based solutions is that they do not require any changes to the end hosts. The methods described herein may be applied to wired and or wireless networks.

Examples of methods in which the network 100 and the network 400 may be employed for minimizing pathological flooding of a network using a destination node will now be described with respect to the following flow diagram of the methods 600 and 700 depicted in FIGS. 6 and 7. It should be apparent to those of ordinary skill in the art that the methods 600 and 700 represent generalized illustrations and that other steps may be added or existing steps may be removed, modified or rearranged without departing from the scopes of the methods 600 and 700.

The descriptions of the methods 600 and 700 are made with reference to the networks 100 and 400 illustrated in FIGS. 1-5, and thus makes reference to the elements cited therein. It should, however, be understood that the methods 600 and 700 are not limited to the elements set forth in the networks 100 and 400. Instead, it should be understood that the methods 600 and 700 may be practiced by a system having a different configuration than that set forth in the network 100 and the network 400.

Figure 6:
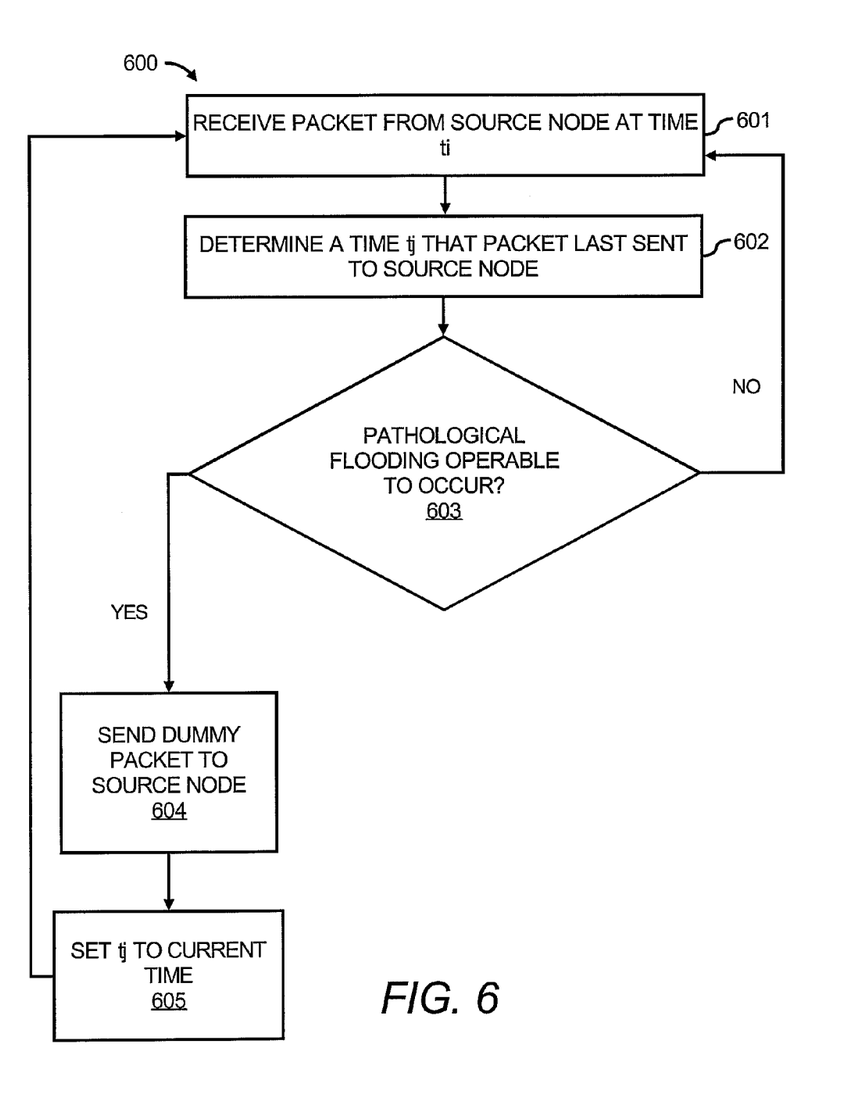
FIG. 6 illustrates a flowchart of a method for minimizing pathological flooding of a network using a destination node, according to an embodiment of the present invention.

With reference first to FIG. 6, there is shown a flowchart of a method 600 for minimizing pathological flooding of a network using a destination node, according to an embodiment. The method 600 is described by way of example with respect to FIGS. 1-3A, the network 100 and an end host based implementation of minimizing pathological flooding of a network using a destination node.

At step 601, the destination end host 103 receives a packet from the source end host 102. The packet 201, as shown in FIG. 2, is transmitted from the source end host 102 to the destination end host 103 along a path. The packet 201 is forwarded by the intermediate nodes 105a-105c along the path. The packet 201 is received at a time ti. The table for the destination end host 103, similar to the table 300 shown in FIG. 3A, is updated to include the receipt time, ti, for the entry for the source end host 102.

At step 602, the destination end host 103 determines tj 303, a time that the destination end host 103 last sent a packet to the MAC address 301 of the source end host 102. The packet last sent to the MAC address 301 of the source end host 102 may be either a dummy packet 202 or a normal packet sent as a part of regular communication from the destination end host 103 to the source end host 102. For example, the destination end host 103 accesses the table 300 and locates the time tj 303 that corresponds to a source end host MAC address 301. As shown in FIG. 3A, the time tj 303A corresponds to the source end host MAC address 301A.

At step 603, a node in the network 100 determines whether pathological flooding is operable to occur for future packets sent from the source end host 102 to the destination end host 103. For instance, the destination end host 103 or one of the intermediate nodes 105a-c determines whether the destination end host 103 has not sent dummy packets 202 or any other packets to the source node of the packet 201 within a predetermined period. For example, the threshold T as described hereinabove with respect to the table 300 and FIG. 3A.

The destination end host 103 maintains a table, such as the table 300 shown in FIG. 3A, for each MAC address 301 from which the destination end host 103 receives packets. For instance, if destination end host 103 receives a packet from the source end host 102, the destination end host 103 enters a new time for ti 303 in the column for the source end host MAC address 301 of the node that sent the packet 201, in this instance the source end host 102. If ti–tj goes above the threshold T, a possibility of pathological flooding is indicated. The threshold T has to be less than the minimum forwarding entry timeout among all the nodes in the network.

At step 604, in response to a determination at step 603 that pathological flooding is operable to occur for future packets sent from the source end host 102 to the destination end host 103, the destination end host 103 sends a dummy packet 202 along the path to the source end host 102. The dummy packet 202 may be a zero payload packet. The dummy packet 202 may be sent as either a unicast message or a broadcast message. At step 605, the destination end host 103 also sets tj 303 to a current time and continues to monitor incoming packets. However, in response to a determination at step 603 that pathological flooding is not operable to occur for future packets sent from the source end host 102 to the destination end host 103, the destination end host 103 continues to monitor incoming packets.

Figure 7:
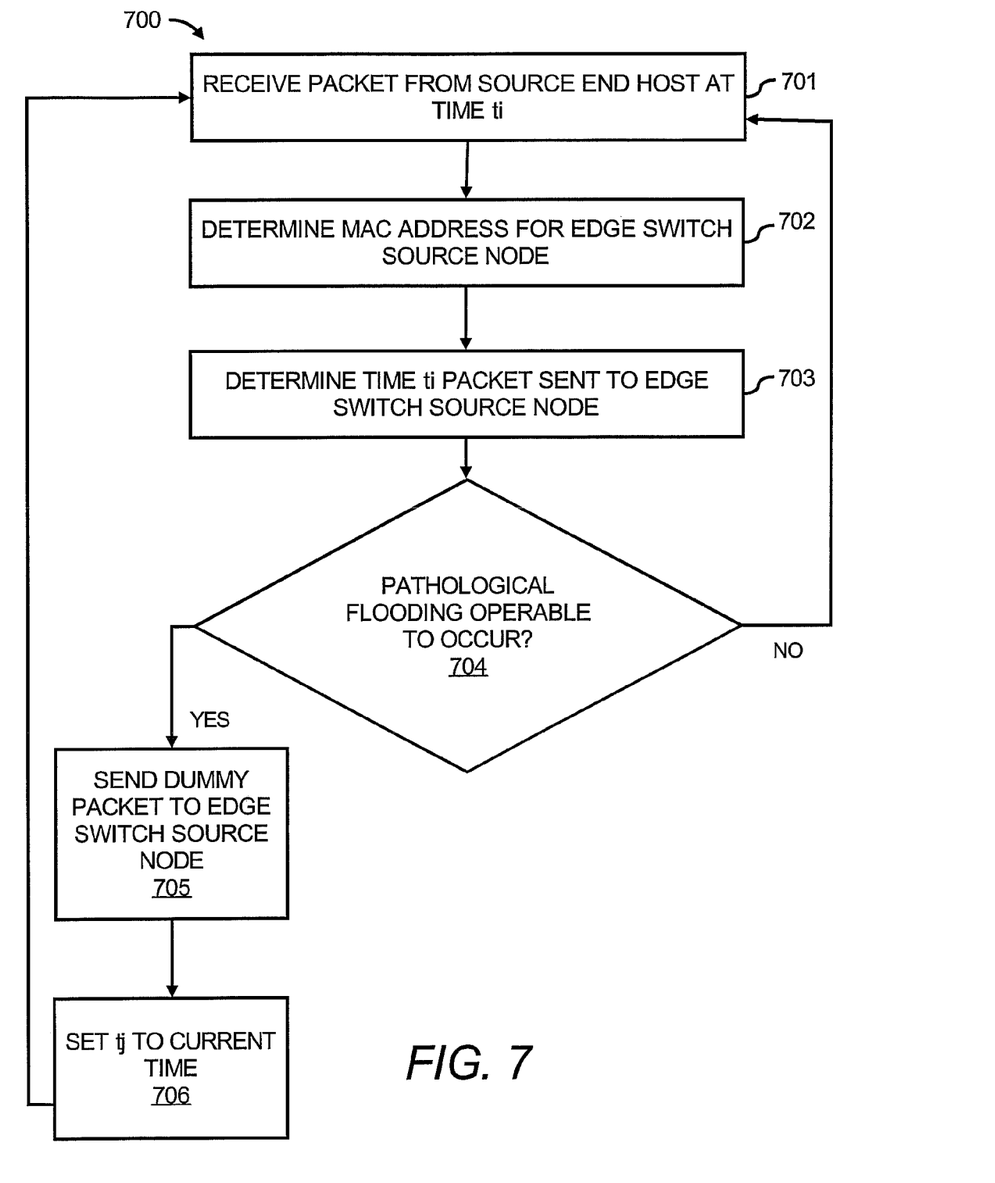
FIG. 7 illustrates a flowchart of a method for minimizing pathological flooding of a network using an edge switch, according to an embodiment of the present invention.

With particular reference to FIG. 7, there is shown a flowchart of a method 700 for minimizing pathological flooding of a network using a destination node, according to an example. The method 700 is described by way of example with respect to FIGS. 3B-5, the network 400 and an edge switch based implementation of minimizing pathological flooding of a network using a destination node.

At step 701, the edge switch destination node 404 receives a packet 201 from the source end host 401. The packet 201 may be destined for the destination end host 402 connected to the edge switch destination node 404. The packet 201, as shown in FIG. 5, is transmitted from the source end host 401 to the destination end host 402 along a path. The packet 201 is received at ti 353, a time of last receipt of packets from the source end host 401 as illustrated in table 3B.

At step 702, the edge switch destination node 404 determines the edge switch source node MAC address 351A that corresponds to the source end host MAC address 352A. For instance, the edge switch destination node 404 uses the table 350 as shown in FIG. 3B. Note that an edge switch source node MAC address may correspond to multiple source end host MAC addresses. As shown in FIG. 3B, the edge switch source node MAC address 351A of the edge switch source node 403 also corresponds to source end host MAC address 352B, which is the MAC address of a different source end host.

At step 703, the edge switch destination node 404 determines tj 354, a time that the edge switch destination node 404 sent a packet to the MAC address 351 of the edge switch source node 403. The packet sent to the MAC address 351 of the edge switch source node 403 may have been either a normal packet or a dummy packet 202. For example, the edge switch destination node 404 accesses table 360 and locates the time tj 354 that the edge switch destination node 404 last sent the dummy packet 202 to the edge switch source node MAC address 351A. Each edge switch, including the edge switch destination node 404, maintains an edge switch destination node table, such as the table 360 shown in FIG. 3C, for each node that is connected to the edge switch.

At step 704, a node in the network 100 determines whether pathological flooding is operable to occur for future packets sent from the source end host 102 to the destination end host 103. For instance, the node may determine whether the edge switch destination node 404 has not sent dummy packets 202 to the source end host 401 of the packet 201 within a predetermined period. The predetermined period is based on a timeout period of the edge switch destination node 404.

At step 705, for instance, in response to a determination at step 704 that pathological flooding is operable to occur for future packets sent from the source end host 102 to the destination end host 103, the edge switch destination node 404 sends a dummy packet 202 along the path to the edge switch source node 403. The dummy packet 202 is a zero payload packet. At step 706, the edge switch destination node 404 sets tj 354 to a current time in the table 360 and continues to monitor incoming packets. However, in response to a determination at step 704 that pathological flooding is not operable to occur for future packets sent from the source end host 102 to the destination end host 103, the edge switch destination node 404 continues to monitor incoming packets.

Figure 8:
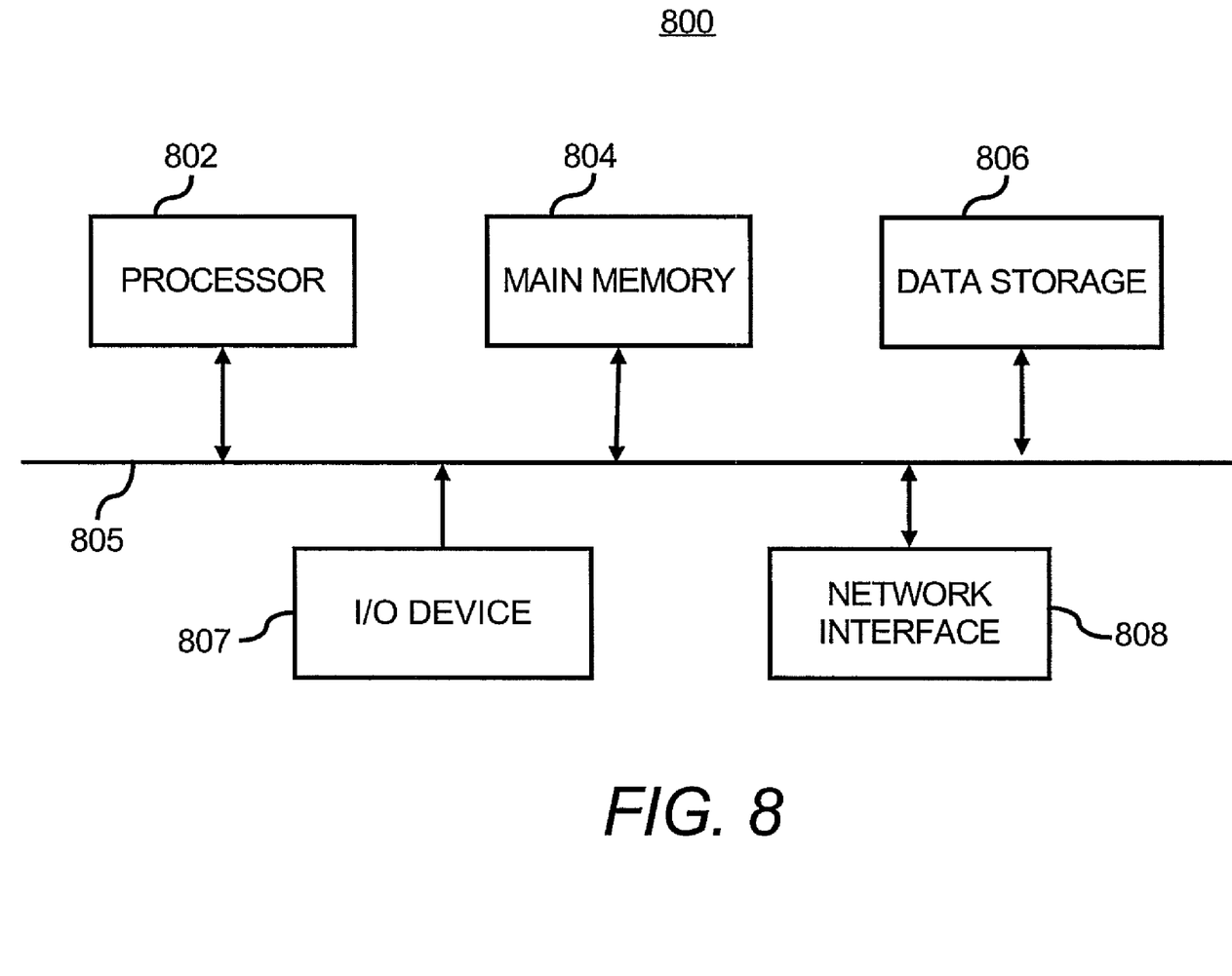
FIG. 8 illustrates a block diagram of a computer system, according to an embodiment of the present invention.

FIG. 8 illustrates an exemplary block diagram of a computer system 800 that may be used as a node in a network described above. The computer system 800 includes one or more processors, such as processor 802, providing an execution platform for executing software.

Commands and data from the processor 802 are communicated over a communication bus 805. The computer system 800 also includes a main memory 804, such as a Random Access Memory (RAM), where software may be resident during runtime, and data storage 806. The data storage 806 includes, for example, a hard disk drive and/or a removable storage drive, representing a floppy diskette drive, a magnetic tape drive, a compact disk drive, etc., or a nonvolatile memory where a copy of the software may be stored. The data storage 806 may also include ROM (read only memory), EPROM (erasable, programmable ROM), EEPROM (electrically erasable, programmable ROM). In addition to software for routing and other steps described herein, routing tables, network metrics, and other data may be stored in the main memory 804 and/or the data storage 806.

A user interfaces with the computer system 800 with one or more I/O devices 807, such as a keyboard, a mouse, a stylus, display, and the like. A network interface 808 is provided for communicating with other nodes and computer systems.

One or more of the steps of the methods described herein and other steps described herein may be implemented as software embedded on a computer readable medium, such as the memory 804 and/or data storage 806, and executed on the computer system 800, for example, by the processor 802. For example, they may exist as software program(s) comprised of program instructions in source code, object code, executable code or other formats for performing some of the steps. Any of the above may be embodied on a computer readable medium, which includes storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for minimizing pathological flooding of a network using a destination node, said method comprising:
   receiving a packet from a source node at the destination node, wherein the packet is transmitted from the source node to the destination node along a path;
   determining, by a node in the network, whether pathological flooding is operable to occur for future packets sent from the source node to the destination node; and
   in response to a determination that the pathological flooding is operable to occur, sending a dummy packet along the path to the source node.

2. The method according to claim 1, wherein determining whether pathological flooding is operable to occur for future packets comprises:
   determining whether the destination node has not sent packets to the source node within a predetermined period.

3. The method according to claim 1, wherein determining whether pathological flooding is operable to occur for future packets comprises:
   determining whether ti−tj is greater than a threshold T, wherein ti is a time of receipt of the packet from the source node, tj is a time a packet was sent to the source node, and T is a predetermined period based on a minimum forwarding entry timeout for the intermediate nodes.

4. The method according to claim 1, further comprising:
   updating ti and updating tj at the destination node after sending the dummy packet.

5. The method according to claim 1, wherein the source node is a source end host and the destination node is a destination end host.

6. The method according to claim 1, wherein the source node is an edge switch source node associated with a source end host and the destination node is an edge switch destination node associated with a destination end host.

7. The method according to claim 6, further comprising:
   determining a source address of the source edge switch associated with the source end host.

8. The method according to claim 1, wherein sending the dummy packet comprises unicasting or broadcasting the dummy packet over the network.

9. The method according to claim 1, wherein the source address includes a media access control (MAC) address.

10. The method according to claim 9, wherein the source address further includes a virtual local area network identification (VLAN id).

11. The method according to claim 1, wherein the dummy packet includes a variable in a header and the source is configured to drop the dummy packet having the variable in the header.

12. A system for minimizing pathological flooding of a network, said system comprising:
   a processor configured to,
      receive a packet from a source node at a destination node, wherein the packet is transmitted from the source node to the destination node along a path,
      determine whether pathological flooding is operable to occur for future packets sent from the source node to the destination node, and
      forward a dummy packet along the path to the source node in response to a determination by the destination node that the packet indicates a possibility of pathological flooding; and
   a storage device configured to store information used to determine whether pathological flooding is operable to occur for future packets sent from the source node to the destination node.

13. The system of claim 12, wherein the destination node is configured to:
   determine whether ti−tj is greater than a threshold T, wherein ti and tj are include in the stored information and ti is a time of receipt of the packet from the source node, tj is a time a packet was sent to the source node, and T is a predetermined period based on a minimum forwarding entry timeout for the intermediate nodes, to determine whether pathological flooding is operable to occur for future packets sent from the source node to the destination node.

14. The system of claim 12, wherein the source node is a source end host and the destination node is a destination end host.

15. The system of claim 12, wherein the source node is an edge switch source node connected to a source end host and the destination node is an edge switch destination node connected to a destination end host.

16. The system of claim 15, wherein further:
   the destination node is configured to determine a source address of the first edge switch associated with the first end host.

17. The system of claim 12, wherein the destination node is configured to forward the dummy packet by unicasting or broadcasting the dummy packet over the network.

18. A computer readable storage device on which is embedded one or more computer programs, said one or more computer programs, when executed by a computer system, implementing a method of minimizing pathological flooding of a network using a destination node, said one or more computer programs comprising a set of instructions for:
   receiving a packet from a source node at the destination node, wherein the packet is transmitted from the source node to the destination node along a path;
   determining by a node whether pathological flooding is operable to occur for future packets sent from the source node to the destination node; and
   in response to a determination that pathological flooding is operable to occur for future packets sent from the source node to the destination node, forwarding a dummy packet along the path to the source node.

19. The computer readable storage device according to claim 18, wherein determining whether pathological flooding is operable to occur for future packets comprises:
   determining whether the destination node has not sent packets to the source node within a predetermined period.

20. The computer readable storage device according to claim 18, wherein determining whether pathological flooding is operable to occur for future packets comprises:
   determining whether ti−tj is greater than a threshold T, wherein ti is a time of receipt of the packet from the source node, tj is a time a packet was sent to the source node, and T is a predetermined period based on a minimum forwarding entry timeout for the intermediate nodes.

* * * * *